(12) United States Patent
Lee et al.

(10) Patent No.: US 9,799,890 B1
(45) Date of Patent: Oct. 24, 2017

(54) MULTI-LAYERED CARBON SUBSTRATE FOR GAS DIFFUSION LAYER

(71) Applicant: JNTG Co., Ltd., Hwaseong-si, Gyeonggi-do (KR)

(72) Inventors: Eun Sook Lee, Suwon-si (KR); Eun Chong Kim, Osan-si (KR); Tae Hyung Kim, Hwaseong-si (KR); Min Jee Yang, Seoul (KR); Jy Young Jyoung, Suwon-si (KR); Tae Nyun Kim, Hwaseong-si (KR); Sang Wook Jang, Suwon-si (KR)

(73) Assignee: JNTG Co., Ltd. (KR)

( * ) Notice: Subject to any disclaimer, the term of this patent is extended or adjusted under 35 U.S.C. 154(b) by 0 days.

(21) Appl. No.: 15/252,711

(22) Filed: Aug. 31, 2016

(30) Foreign Application Priority Data

Apr. 15, 2016 (KR) ........................ 10-2016-0046500

(51) Int. Cl.
*H01M 4/86* (2006.01)
*H01M 4/88* (2006.01)

(52) U.S. Cl.
CPC ...... *H01M 4/8807* (2013.01); *H01M 2250/20* (2013.01)

(58) Field of Classification Search
CPC .................. H01M 4/8807; H01M 2250/20
See application file for complete search history.

(56) References Cited

U.S. PATENT DOCUMENTS

| 2014/0011118 A1 | 1/2014 | Lee et al. |
| 2014/0162167 A1 | 6/2014 | Hong et al. |

FOREIGN PATENT DOCUMENTS

| JP | 2013191435 A | 9/2013 |
| JP | 2015005525 A | 1/2015 |
| KR | 20140006718 A | 1/2014 |

OTHER PUBLICATIONS

Han K. et al. "Influence of anisotropic bending stiffness of gas diffusion layers on the electrochemical performances of polymer electrolyte membrane fuel cells", International Journal of Hydrogen Energy, 35 (2010) pp. 12317-12328.

*Primary Examiner* — Brittany Raymond
(74) *Attorney, Agent, or Firm* — St. Onge Steward Johnston & Reens, LLC (57) ABSTRACT

Provided is a carbon substrate for a gas diffusion layer of a fuel cell. The carbon substrate has a structure, in which a plurality of unit carbon substrates are stacked. Each of the unit carbon substrates is a plate type substrate having a first surface and a second surface opposite to the first surface. Carbon fibers are randomly arranged on the first surface of the each unit carbon substrate. The number of the carbon fibers arranged in a machine direction of the unit carbon substrate is greater than the number of carbon fibers arranged in a transverse direction of the unit carbon substrate from the first surface to the second surface along a thickness direction of the unit carbon substrate; and, accordingly, an orientation gradient, in which the orientation in the machine direction increases from the first surface to the second surface, is shown.

10 Claims, 7 Drawing Sheets

ISOTROPIC

ANISOTROPIC
(MD ORIENTATION)

FIG. 1A

METAL BIPOLAR PLATE STRUCTURE
ACCORDING TO PRIOR ART

FIG. 1B

POROUS BIPOLAR PLATE STRUCTURE

ISOTROPIC b

ANISOTROPIC
(MD ORIENTATION)

ANISOTROPIC
(MD ORIENTATION)

EXAMPLE 1   EXAMPLE 2   EXAMPLE 5

MULTI-LAYERED CARBON SUBSTRATE FOR GAS DIFFUSION LAYER

FIELD OF THE INVENTION

One or more embodiments relate to a carbon substrate for a gas diffusion layer in a fuel cell, and more particularly, to a multi-layered carbon substrate including a plurality of unit carbon substrates orientated in a machine direction (MD) and stacked on one another so that a gas diffusion layer including the multi-layered carbon substrate has increased mechanical strength and high gas diffusion performance.

BACKGROUND OF THE INVENTION

The inventive concept is a result of research projects supported by Korea Institute of Energy Technology Evaluation and Planning (Project ID. 2014010031880) of the Ministry of Trade, Industry and Energy.

Compared to other fuel cells, a polymer electrolyte membrane fuel cell (PEMFC) has low operating temperature, high efficiency, high current density, high power density, short starting time, and a rapid response speed in response to a load change. In the PEMFC, a catalyst is respectively applied to an anode and a cathode of a polymer electrolyte membrane (catalyst coated membrane, CCM). Also, the PEMFC includes a membrane electrode assembly (MEA) obtained by attaching a gas diffusion layer onto the catalyst and bipolar plates attached to opposite surfaces of the MEA. The gas diffusion layer (GDL) can be obtained by coating carbon slurry for the microporous layer (MPL) on a carbon substrate including a porous carbon material such as a carbon cloth, carbon felt, and carbon paper.

One of the current issues in the field of hydrogen fuel cell vehicles (HFCVs) is the development of components and materials capable of reducing the volume of existing the components, reducing the component prices, increasing durability thereof, and obtaining fuel cells with high performance. A metal bipolar plate used as a fuel cell bipolar plate in order to decrease the price of a fuel cell vehicle (FCV) and to increase the energy density has a greater stacking pressure than that of a carbon bipolar plate, and accordingly, a pressure per unit area applied to the MEA and the GDL greatly increases and the GDL can collapse. This can cause degradation of the performance and durability of the fuel cell.

In addition, many vehicle manufacturers consider switching the priority of production from recreation vehicles (RVs) to sedans or compact cars. To do this, it is necessary to reduce the volume of fuel cell stacks and also reduce a thickness of the metal bipolar plate and a thickness of the GDL.

Figure 1A:
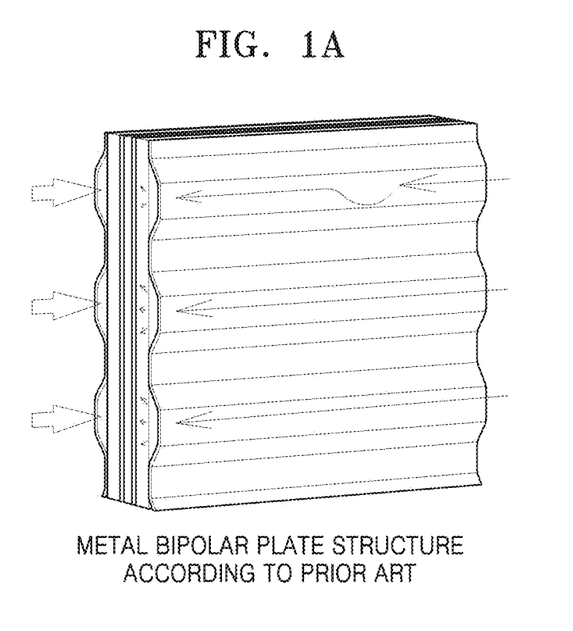
Figure 1B:
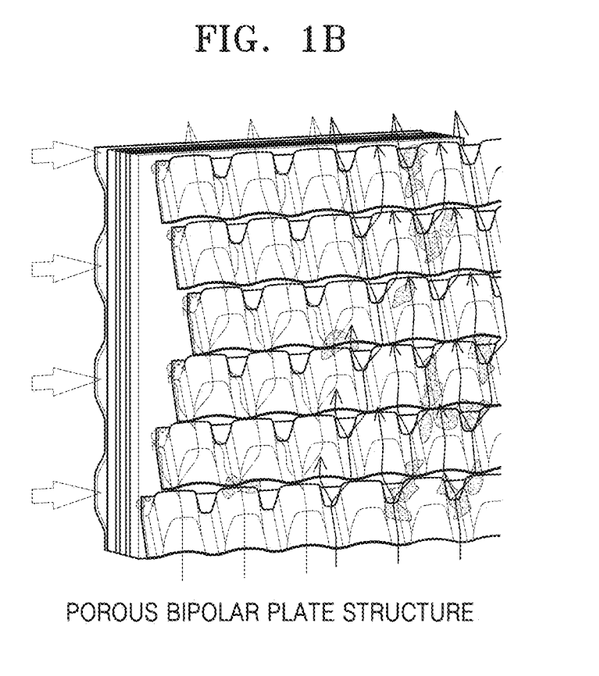

Referring to FIG. 1, a metal bipolar plate a according to the prior art has channel formed therein and provides fuel and oxygen to a GDL via the channels. However, a porous bipolar plate b that has been recently developed and applied to an air electrode distributes air, generates air turbulence due to its three-dimensional structure, and provides the air to an entire GDL. Regarding the bipolar plate of the prior art, the GDL and the bipolar plate are in surface-contact with each other. However, in the case of the porous bipolar plate, the GDL and the porous bipolar plate are in point or line-contact with each other. Thus, a pressure applied to the GDL when stacking the porous bipolar plate is much higher than that in the case of the metal bipolar plate having grooves. Therefore, a GDL applied to vehicles needs to have high mechanical strength and reduced thickness.

In addition, stacks of the PEMFC shrinks or expands due to temperature variation or reaction conditions when the PEMFC is driven. As such, pressures applied to components in each stack vary, and a gasket and the GDL act as a spring for buffering the pressure. Most GDLs recover a little bit or rarely recover after being deformed by the pressure. However, since the gasket does not function as a spring by itself, the GDL is expected to have the mechanical characteristics of a spring.

Most of the GDLs of a carbon paper type are made by papermaking carbon fibers in a wet-laid felt process, and thus, generally have an isotropic structure including carbon fibers that are irregularly arranged. However, a GDL with such an isotropic structure has the same structure at any surface, and thus, when a force is applied to a surface directly contacting the GDL in the bipolar plate structure with grooves, the carbon fibers can be broken and compressed. Thus, the GDL can be intruded into the grooves or flow fields in the bipolar plate, that is, intrusions occur. Accordingly, a space through which air or fuel moves is reduced. Such an intrusion causes a pressure drop in the flow fields in the bipolar plate and also increase in the power consumption of a pump. Also, the collapse of the GDL structure due to the carbon fibers broken at the interface between the GDL and the flow fields causes degradation of the durability of the GDL and also reducing a reactive gas or the generated water transfer.

SUMMARY OF THE INVENTION

One or more embodiments include a carbon substrate for a gas diffusion layer, the carbon substrate having improved elasticity and resistance against pressure occurring when fuel cells are coupled.

One or more embodiments include a carbon substrate for a gas diffusion layer of a fuel cell, whereby an intrusion of the gas diffusion layer into flow fields in a metal bipolar plate is improved.

One or more embodiments include a carbon substrate for a gas diffusion layer, the carbon substrate being capable of effectively improving the transfer of oxygen and hydrogen from a porous bipolar plate to an electrode layer.

One or more embodiments include a carbon substrate for a gas diffusion layer, the carbon substrate having a structure capable of effectively exhausting water from an air electrode to a porous bipolar plate.

One or more embodiments include a gas diffusion layer for a fuel cell, the gas diffusion layer including the carbon substrate for the gas diffusion layer of a fuel cell.

One or more embodiments include a membrane electrode assembly having improved cell performance due to inclusion of the gas diffusion layer in the fuel cell.

One or more embodiments include a fuel cell having the gas diffusion layer in a fuel cell and thus having improved cell performance.

Additional aspects will be set forth in part in the description which follows and, in part, will be apparent from the description, or can be learned by practice of the presented embodiments.

According to one or more embodiments, a carbon substrate for a gas diffusion layer of a fuel cell, the carbon substrate includes a structure in which two to eight unit carbon substrates are stacked, wherein each of the unit carbon substrates is a plate type substrate having a first surface and a second surface opposite the first surface, each of the unit carbon substrates includes carbon fibers forming a non-woven carbon backing layer and a carbonized polymer arranged between the carbon fibers and bonding the carbon fibers, wherein:

a) the number of the carbon fibers arranged in a machine direction (MD) in each of the unit carbon substrates is greater than the number of carbon fibers arranged in a transverse direction (TD) in each of the unit carbon substrates, the carbon fibers are randomly arranged on the first surface of the each of the unit carbon substrates and, from the first surface to the second surface in a thickness direction of each of the unit carbon substrates, the number of the carbon fibers arranged in the machine direction of each of the unit carbon substrates becomes greater than the number of carbon fibers arranged in the transverse direction of each of the unit carbon substrates, and accordingly, the orientation in the machine direction (MD) increases from the first surface to the second surface, or b) the number of carbon fibers arranged in the machine direction of each of the unit carbon substrates is greater than the number of carbon fibers arranged in the transverse direction of each of the unit carbon substrates so that each of the unit carbon substrates has an orientation in the machine direction, the orientation in the machine direction of each of the unit carbon substrates is constant from the first surface to the second surface along the thickness direction of each of the unit carbon substrates, and the unit carbon substrates are stacked on one another so that the machine directions of two adjacent unit carbon substrates are perpendicular to each other.

In a), a ratio of the number of carbon fibers arranged in the machine direction to the number of carbon fibers arranged in the transverse direction (MD/TD) on the second surface is preferably from 1.5 to 4.0.

In a), the unit carbon substrates can be stacked on one another so that the first surface of one of two adjacent unit carbon substrates contacts the second surface of the other of the two adjacent unit carbon substrates.

In a), the unit carbon substrates can be stacked on one another so that the first surfaces or second surfaces of two adjacent unit carbon substrates can contact each other.

The unit carbon substrates can be stacked on one another so that the machine directions of the unit carbon substrates can be parallel to each other.

The unit carbon substrates can be stacked on one another so that the machine directions of two adjacent unit carbon substrates can be perpendicular to each other.

In b), a ratio of the number of carbon fibers arranged in the machine direction to the number of carbon fibers arranged in the transverse direction (MD/TD) can be 1.5 to 4.0.

In b), the carbon fibers can include two or more types of carbon fibers having different lengths, the two or more types of carbon fibers can include first carbon fibers and second carbon fibers, lengths of the second carbon fibers can be longer than lengths of the first carbon fibers, the first carbon fibers can be arranged more than the second carbon fibers toward the first surface in the thickness direction of the unit carbon substrate, whereas the second carbon fibers can be arranged more than the first carbon fibers toward the second surface, and a pore size gradient can be shown so that sizes of pores increase gradually from the first surface to the second surface in the thickness of each of the unit carbon substrates.

According to one or more embodiments, the mechanical strength, in particular, the orientation of the carbon fibers in the machine direction MD of the carbon substrate, is controlled so as to improve a bending strength of the carbon substrate is improved. Therefore, intrusion, that is, infiltration of the gas diffusion layer into the flow field of the metal bipolar plate, can be reduced.

Also, since the carbon substrate according to the one or more embodiments is pressure-resistant, the spring characteristics thereof can be improved. In addition, the gas diffusion layer including the carbon substrate has gas diffusion resistance that is reduced throughout the layers, and thus, has a relatively high reaction gas diffusion property.

In addition, the gas diffusion layer including the carbon substrate according to the one or more embodiments has improved water discharging performance, and thus, the water generated when the fuel cell is driven can be discharged effectively and degradation of the performance of the unit cell due to water flooding can be prevented.

BRIEF DESCRIPTION OF THE DRAWINGS

These and/or other aspects will become apparent and more readily appreciated from the following description of the embodiments, taken in conjunction with the accompanying drawings in which:

FIGS. 1A and 1B are diagrams of a metal bipolar plate for a hydrogen fuel cell, wherein FIG. 1A shows a metal bipolar plate according to the prior art, the metal bipolar plate having a channel and a rib structure, and FIG. 1B shows a porous bipolar plate on which gas and water move along various paths;

DETAILED DESCRIPTION OF THE INVENTION

Reference will now be made in detail to embodiments, examples of which are illustrated in the accompanying drawings, wherein like reference numerals refer to like elements throughout. In this regard, the present embodiments can have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a substrate for a gas diffusion layer of a fuel cell, a method of manufacturing the substrate, an electrode including the substrate, a membrane electrode assembly including the electrode, and a fuel cell including the membrane electrode assembly will be described.

Figure 2:
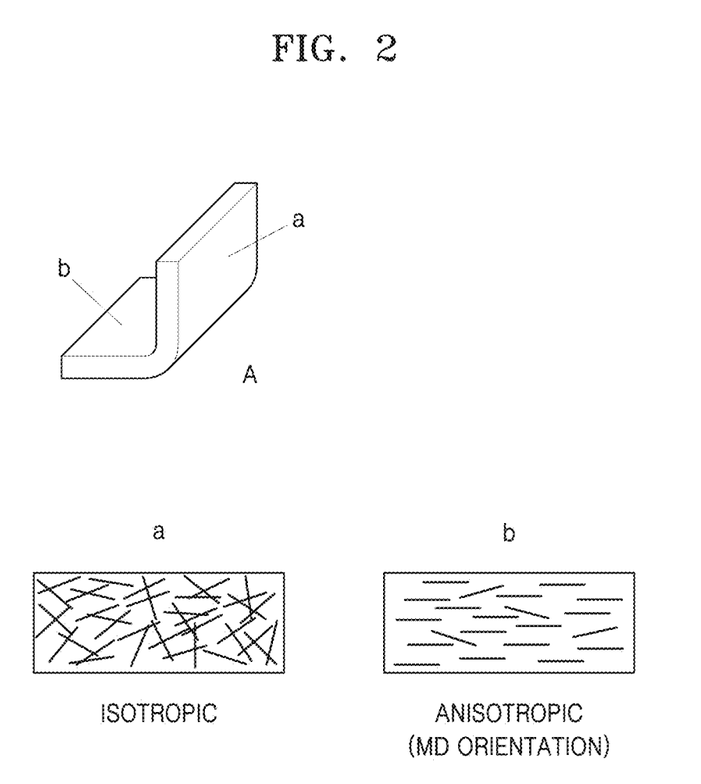
FIG. 2 is a schematic diagram of a unit carbon substrate according to an embodiment.

A carbon substrate for a gas diffusion layer of a fuel cell according to an embodiment has a structure including a plurality of unit carbon substrates stacked on one another. FIG. 2 is a schematic diagram of an orientation on a surface of a unit carbon structure according to the embodiment.

The unit carbon substrate is a plate type substrate having a first surface (a in FIG. 2) and a second surface (b in FIG. 2) opposite the first surface. The unit carbon structure includes carbon fibers and an organic polymer carbide arranged between the carbon fibers bonding the two carbon layers. Regarding the carbon fibers, the number of carbon fibers arranged in a machine direction (MD) of the unit carbon substrate is greater than the number of carbon fibers arranged in a transverse direction (TD) of the unit carbon substrate. The first surface of the unit carbon substrate has an isotropic structure in which the carbon fibers are randomly arranged. The number of carbon fibers arranged in the machine direction (MD) of the carbon substrate becomes greater than the number of the carbon fibers arranged in the transverse direction TD from the first surface toward the second surface along a thickness direction of the carbon substrate. Accordingly, an orientation gradient is formed so that an orientation in the machine direction MD of the carbon substrate increases from the first surface to the second surface.

A ratio of the number of carbon fibers arranged in the machine direction MD to the number of the carbon fibers arranged in the transverse direction TD on the first surface (MD/TD) is about 0.9 to 1.1, that is, the first surface has the isotropic structure in which the carbon fibers are randomly arranged. In addition, the ratio between the number of the carbon fibers along the machine direction MD and the number of the carbon fibers along the transverse direction TD on the second surface can be about 1.5 to 4.0.

When n carbon substrates (n is 2 to 8) are stacked on one another, the unit carbon substrates can be have the same weight and thickness or different weights and thicknesses.

FIGS. 3A to 3D are schematic diagrams showing examples of stacking the unit carbon substrates according to the embodiment. In FIGS. 3A to 3D, for convenience of description, the unit carbon substrates are shown as being spaced from one another, however the unit carbon substrates can be stacked to be in contact with each other in an actual stacking process.

Figure 3A:
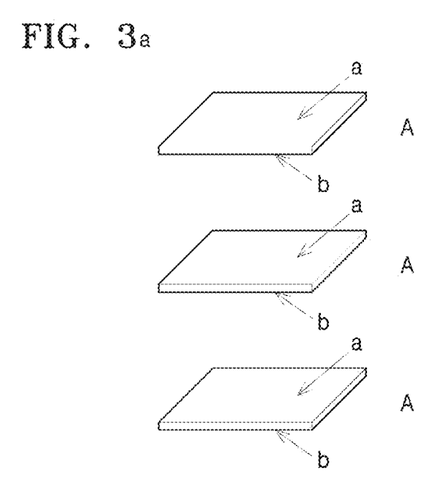
FIGS. 3A to 3D are diagrams of stack structures of a carbon substrate according to an embodiment.
Figure 3B:
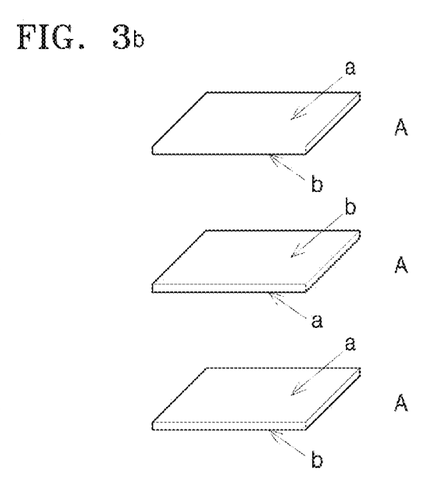
Figure 3C:
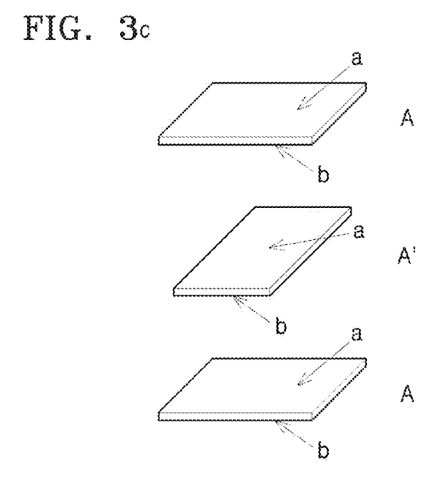

The unit carbon substrates can be stacked on one another so that the first surface of one of two adjacent unit carbon substrates and the second surface of the other of the two adjacent unit carbon substrate can contact each other (see FIGS. 3A and 3C). That is, the stacking structure can be in a form of [first surface/second surface//first surface/second surface//first surface/second surface . . . ]

Otherwise, the unit carbon substrates can be stacked on one another so that the first surfaces or the second surfaces of two adjacent unit carbon substrates can contact each other. That is, the stacking structure can be in a form of [first surface/second surface//second surface/first surface//first surface/second surface . . . ] (see FIGS. 3B and 3D).

According to another embodiment, the unit carbon substrates can be stacked on one another so that the orientations in the machine direction MD of the unit carbon substrates can coincide with one another (see FIGS. 3A and 3B).

Figure 3D:
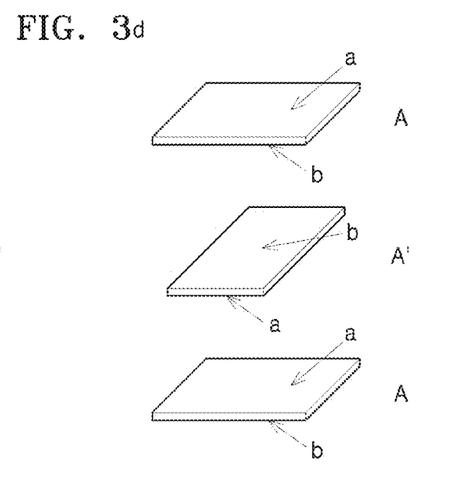

According to another embodiment, the unit carbon substrates can be stacked on one another so that the orientations of the adjacent unit carbon substrates in the machine direction MD can be perpendicular to each other (see FIGS. 3C and 3D).

Figure 4:
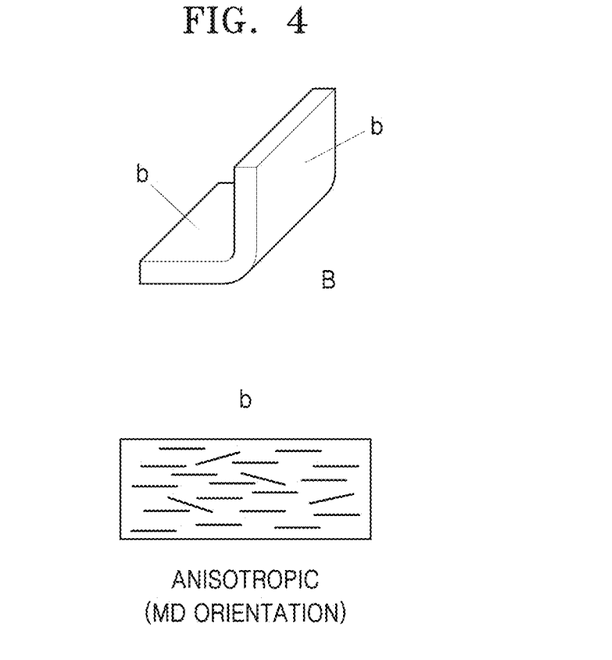
FIG. 4 is a schematic diagram of a unit carbon substrate according to an embodiment.

A carbon substrate for a gas diffusion layer of a fuel cell according to another embodiment has a structure including a plurality of unit carbon substrates stacked on one another. FIG. 4 is a schematic diagram of an orientation structure on a surface of a unit carbon substrate according to an embodiment.

The unit carbon substrate is a plate type substrate having a first surface and a second surface opposite the first surface. The carbon substrate includes carbon fibers forming a non-woven carbon backing layer and an organic polymer carbide arranged between the carbon fibers bonding the carbon layers. The number of the carbon fibers arranged in the machine direction MD of the carbon substrate is greater than the number of the carbon fibers arranged in the transverse direction TD, and accordingly, the carbon substrate has an orientation in the machine direction MD. In addition, the orientation in the machine direction MD of the carbon substrate becomes constant from the first surface toward the second surface along the thickness direction of the carbon substrate.

Figure 5:
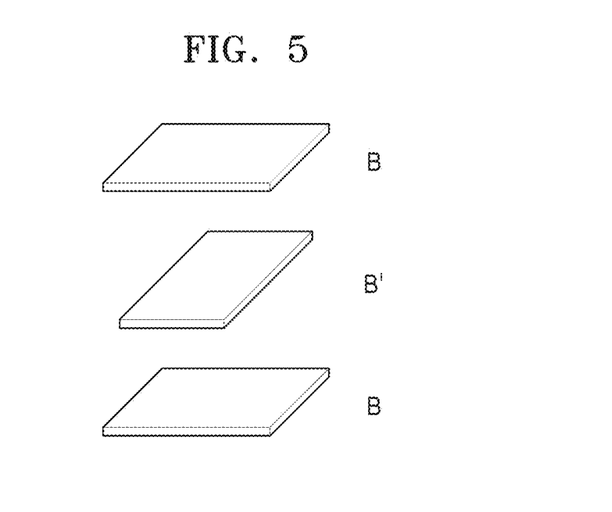
FIG. 5 is a diagram of a stack structure of a carbon substrate according to an embodiment.

According to an embodiment, the unit carbon substrates can be stacked on one another so that the orientations of the adjacent unit carbon substrates in the machine direction MD are perpendicular to each other (see FIG. 5). In FIG. 5, for convenience of description, the unit carbon substrates are shown as being spaced apart from each other; however the unit carbon substrates can be stacked on one another to be in contact in an actual stacking process.

According to the orientation in the machine direction MD, the MD/TD ratio ranges from about 1.5 to 4, preferably about 1.5 to 3. When the MD/TD ratio is less than 1.5, the carbon substrate has the isotropic structure and is resistant against diffusion of a reaction gas in a plane direction, and thus, the performance thereof degrades at a high current density. In addition, since the carbon substrate intrudes into a rib of a bipolar plate of the fuel cell, the durability of the fuel cell degrades. When the MD/TD ratio is greater than 4, the mechanical strength of the carbon substrate in the transverse direction degrades and the carbon substrates can break during stacking.

In addition, the carbon substrate for the gas diffusion layer having the orientation in the machine direction MD according to the one or more embodiments can have a pore size gradient in the thickness direction thereof. In detail, the carbon fibers in the carbon substrate can be of two or more kinds and have different lengths from each other. The carbon fibers of the two or more kinds include first carbon fibers and second carbon fibers, lengths of the second carbon fibers being longer than lengths of the first carbon fibers. In addition, the first carbon fibers are predominantly arranged closer to the first surface of the carbon substrate in the thickness direction of the carbon substrate, and the second carbon fibers are predominantly arranged closer to the second surface of the carbon substrate. Thus, the carbon substrate has a pore size gradient according to which sizes of pores in the carbon substrate increase from the first surface toward the second surface. In addition, lengths of the carbon fibers can vary with each of the unit carbon substrates. Also, the unit carbon substrates having the carbon fibers of different lengths from each other are stacked according to the embodiment, and thus, the carbon substrate has the pore size gradient in the thickness direction thereof.

All aspects of the present disclosure can be combined with each other.

Next, a method of manufacturing a carbon substrate for a gas diffusion layer according to an embodiment will be described. Each unit carbon substrate is manufactured as follows.

First, a wire mesh is put into a dispersion of carbon fibers dispersed in a dispersion medium to form a carbon fiber preweb. In the above process of forming the carbon fiber preweb, a direction of and a time period for supplying the carbon fibers to the wire mesh in the dispersion medium and a speed of introducing the wire mesh can vary. The dispersion including the carbon fibers passes through a feeding unit in which a gap between a wire and an external barrier wall is gradually reduced, and then, the carbon fibers become parallel to flow of the dispersion and be deposited on a surface of the wire moving at a constant velocity. The dispersion medium that is initially supplied through the feeding unit is deposited on the surface of the wire in a state where the carbon fibers do not have directionality yet, and as the wire moves toward a narrow gap in the feeding unit, more the carbon fibers are oriented in the machine direction MD and deposited due to the velocity of the dispersion flow and the velocity of the winding of the wire.

The carbon fibers can have constant orientations throughout the first surface and the second surface of the carbon substrate or can have an orientation in the machine direction MD increasing from the first surface toward the second surface when the carbon fibers are stacked on one another. However, one or more embodiments are not limited thereto.

If the carbon fibers have the constant orientation in the thickness direction of the carbon substrate, the MD/TD ratio can range from about 1.5 to about 4.0, and preferably from about 1.5 to about 3.0.

Otherwise, if the carbon fibers have the orientation in the machine direction MD increasing from the first surface toward the second surface, the MD/TD ratio ranges from about 0.5 to about 1.2 within a range of about 10% to about 35% in the entire thickness of the carbon substrate from the first surface, preferably about 0.8 to about 1.1. Accordingly, a paper-making machine is designed so that, as the wire proceeds therethrough, the orientation in the machine direction MD gradually increases, and at the last stage, most of the carbon fibers have the orientation in the machine direction MD. In this case, the MD/TD ratio in an intermediate portion of the carbon substrate is controlled to range from about 1.2 to about 2.0, the MD/TD ratio in a range of about 40% to about 70% from the second surface is controlled to be in range from about 1.5 to about 4.0, preferably about 1.5 to about 3.0.

According to the embodiment, the carbon fiber preweb obtained through the above processes has a plate shape having the first surface and the second surface opposite the first surface, and the first surface and the second surface can have the same structure or structures different from each other.

In addition, the carbon fiber preweb according to the embodiment can include a kind of carbon fibers having the same lengths.

Alternatively, the carbon fiber preweb according to the embodiment can include two or more kinds of carbon fibers having different lengths from each other. The carbon fibers of two or more kinds include first carbon fibers and second carbon fibers having longer lengths than those of the first carbon fibers. In the carbon fiber preweb forming process, based on floating times of carbon fibers dependent on the lengths of the carbon fibers, the forming of the carbon fiber preweb is controlled until the carbon fibers are deposited on the wire mesh in the dispersion medium so that first carbon fibers having a shorter length are densely deposited on the mesh wire side, and then second carbon fibers having a longer length than the first carbon fibers are deposited predominantly thereon. Accordingly, the pore size gradient is formed, that is, that sizes of the pores, increase from the first surface toward the second surface.

According to the embodiment, the dispersion can further include a binder staple fiber. For example, the binder staple fiber can be one or at least two selected from the group consisting of a polyvinyl alcohol (PVA) staple fiber, a low-melting point (LM) polyester staple fiber, a polyethylene (PE) staple fiber, a polypropylene (PP) short fiber, a cellulose staple fiber, and a pitch staple fiber.

According to the embodiment, the carbon substrate for the gas diffusion layer of the fuel cell can be manufactured in two ways. First, carbon fiber prewebs that are manufactured sequentially by a paper-making machine having n number of head boxes are stacked on one another while being manufactured in a paper-shape structure. A first carbon fiber preweb is formed in a head box of a first zone and then is placed on a pickup belt, and then, a second carbon fiber preweb formed in a head box of a second zone is placed on the pickup belt so that two prewebs can be stacked on each other. When the paper-making machine including the n head boxes is used, n prewebs that are stacked can be obtained. That is, a preweb that has passed through an n-th head box is stacked on the pickup belt, on which n−1 prewebs are stacked, and then, the stacked prewebs pass through a dry zone and are laminated. Otherwise, each preweb is formed, and then, the prewebs are cut to have constant lengths and are stacked on one another according to the orientation direction. After that, an aqueous polymer is coated on the stacked prewebs and the stacked prewebs are laminated to obtain the preweb.

According to another embodiment, after the process of forming the carbon fiber preweb, in a process wherein the carbon fiber preweb is impregnated into a slurry including a thermosetting or thermo-plastic resin and a carbon filler and then is dried to obtain an impregnated carbon fiber preweb, each carbon fiber preweb is obtained and then stacked on other carbon fiber prewebs to be laminated. However, the one or more embodiments are not limited to the above examples, and the carbon substrate can be manufactured by an appropriate method known to one of ordinary skill in the art.

The gas diffusion layer GDL can be formed through a curing process, in which heat and pressure are applied to the impregnated carbon fiber preweb to compress the carbon fiber preweb; a carbonization process in which the carbon fiber preweb is heated in an inert atmosphere to carbonize the resin to obtain a carbon substrate; a process in which the carbon substrate is treated by using a fluorine-based resin suspension or an emulsion to obtain the carbon substrate on which the fluorine-based resin is impregnated; and a process of coating a microporous layer MPL on the carbon substrate. Sizes of pores in the microporous layer MPL range between about 0.1 μm to about 20 μm. The microporous layer MPL can also have a pore size gradient, and in this case, water generated from a catalyst layer can be effectively discharged to the microporous layer MPL.

An electrode for a fuel cell according to an embodiment includes the carbon substrate for the gas diffusion layer GDL described above, and can be used as a cathode or an anode of a fuel cell.

A membrane electrode assembly for a fuel cell according to the embodiment includes the electrode.

A fuel cell according to an embodiment includes the membrane electrode assembly according to the embodiment.

Hereinafter, one or more embodiments will now be described in detail with reference to the following examples. However, these examples are not intended to limit the scope of the one or more embodiments of the present invention.

Preparation Example 1

As raw materials, carbon staple fibers of 90 wt % with respect to a weight of entire fibers were prepared and PVA staple fibers of 10 wt % were prepared, wherein the carbon staple fibers contained carbon by 95%, had a diameter of about 7 μm, a density of about 1.81 g/cc, average lengths of about 6 mm and 12 mm, and a precursor of PAN (here, content amount ratio between the carbon staple fibers of 6 mm length and 12 mm length was 50/50). Then, a carbon fiber preweb was manufactured through the carbon preweb manufacturing processes, that is, fiber mixture, dispersion of fibers in water, and deposition on the wire. The carbon fibers dispersed in water were supplied to a paper-making machine via a pump. A supply unit connected to a head box of the paper-making machine had a structure that narrowed toward the head box, and the carbon fibers were arranged in parallel with a direction in which the dispersion liquid flowed. Slits between the wire and the supply unit were adjustable in a portion where the dispersion liquid initially contacted the wire. When a gap between the slits was greater than lengths of the carbon fibers, an isotropic structure was most likely formed, and when the gap between the slits was smaller than lengths of the carbon fibers, an anisotropic structure was obtained. In preparation example 1, the dispersion liquid passed through a section in which a swirl can be generated before contacting the wire, and the gap between the slits was greater than the lengths of the carbon fibers so that the MD/TD ratio on the second surface was to be 2.5. The gap between slits in the head box was gradually reduced, and thus, the carbon fibers were gradually arranged in the machine direction. In particular, as a speed of supplying the dispersion liquid increased and the gap became smaller, and as a speed of forming the preweb on the wire increased, the orientation in the machine direction MD increased.

As such, a preweb, in which the MD/TD ratio of carbon fibers was 1.1 on the first surface, 1.8 on the intermediate portion, and 2.5 on the second surface was obtained.

The dispersion medium in the carbon fibers formed on the wire in the head box was dehydrated and dried through a dehydration process to obtain the preweb.

The preweb that was dried underwent heating and pressurizing processes performed at a temperature of about 80° C. to about 150° C. and under a pressure of 1 to 10 kg/cm² and a winding process.

The carbon fiber preweb obtained as above underwent an impregnation process, a curing process, and a carbonization process to form a carbon substrate for a gas diffusion layer.

In the impregnation process, a slurry in which a phenol resin solution (molecular weight: about 3000 to 5000, solvent: N-methyl-2-pyrrolidone) and graphite particles (manufacturer: Asbury Carbons, Model No. 5991) were dispersed (weight ratio of phenol resin/graphite particles: 50/50, total solid content of the mixture: about 20 wt %) in an amount of 3 mg/cm² were impregnated into the carbon fiber preweb.

In the curing process, a heating belt 3111a having a temperature of about 120° C. and a three-stage roll 3121a having a temperature increasing to about 100° C., about 150° C., and about 180° C. were used to dry and harden the carbon fiber preweb. A pressure was increased to a range of about 1 to 10 kg/cm². A cooling room 3131 was adjusted to about 30° C. or less by using cooling air. In the carbonization process, the carbonization was performed in a carbonization treatment furnace of a temperature about 900° C. for about 30 minutes, while injecting nitrogen or argon at an injecting speed of 30 L/min. In addition, a graphitization process was performed on a graphitization treatment surface at a temperature about 2000° C. for 30 minutes, while injecting nitrogen or argon at an injecting speed of 10 L/min. Then, the carbon substrate having characteristics illustrated in Table 1 was obtained.

Preparation Example 2

A carbon fiber preweb having a MD/TD ratio of 2.0 on the first surface and the second surface was manufactured in the same manner as in preparation example 1, except that there was no section for generating a swirl before the dispersion liquid contacted the wire and a gap between slits on a portion where the dispersion liquid initially contacted the wire was equal to the length of the carbon fiber. After that, the carbon substrate having the characteristics illustrated in Table 1 was obtained through the same processes as in preparation example 1.

Example 1

Two unit carbon substrates manufactured according to preparation example 1 were stacked on each other, compressed, and dried to obtain a stacked unit carbon substrate. The stacking was performed so that a second surface of a first unit carbon substrate at an upper level and a first surface of a second unit carbon substrate at a lower level were in contact with each other.

The stacking was performed by using a paper-making machine including two head boxes. In a head box of a first zone, a first carbon fiber preweb (unit carbon substrate) was formed and placed on a pickup belt, and then, a second carbon fiber preweb (unit carbon substrate) formed in a head box of a second zone was placed on the pickup belt so that two carbon fiber prewebs can be stacked.

The dried preweb underwent a heating and pressurizing process at a temperature of about 80° C. to about 150° C. and a pressure of about 1 to about 10 kg/cm² and a winding process to obtain the carbon fiber preweb.

An impregnation process, a curing process, and a carbonization process were performed on the carbon fiber preweb to obtain the carbon substrate for the gas diffusion layer.

In the impregnation process, a slurry in which a phenol resin solution (molecular weight: about 3000 to 5000, solvent: N-methyl-2-pyrrolidone) and graphite particles (manufacturer: Asbury Carbons, Model No. 5991) were dispersed (weight ratio of phenol resin/graphite particles: 50/50, total solid content of the mixture: about 20 wt %) in an amount of 3 mg/cm² were impregnated into the carbon fiber preweb.

In the curing process, a heating belt 3111a having a temperature of about 120° C. and a three-stage roll 3121a having a temperature increasing to about 100° C., about 150° C., and about 180° C. were used to dry and harden the carbon fiber preweb. A pressure was increased within a range of about 1 to about 10 kg/cm². A cooling room 3131 was adjusted to be at a temperature of about 30° C. or less by using cooling air. In the carbonization process, the carbonization was performed in a carbonization treatment furnace of a temperature about 900° C. for about 30 minutes, while injecting nitrogen or argon at an injecting speed of 30 l/min. In addition, a graphitization process was performed in a graphitization treatment surface of a temperature about 2000° C. for about 30 minutes, while injecting nitrogen or argon at an injecting speed of about 10 L/min. Then, the carbon substrate having the characteristics illustrated in Table 1 was obtained.

After that, 1,000 g of deionized water, 20 g of dispersant (Triton X-100), g of carbon black (Vulcan XC-72), and 8 g of a 60 wt % polytetrafluoroethylene (PTFE) dispersion were mechanically mixed together to obtain a composition for a microporous layer MPL. The composition for the microporous layer MPL was applied on the stacked carbon substrate and dried at a temperature of 120° C., and after that, a resultant product was thermally treated at a temperature of about 350° C. for about 30 minutes to obtain a gas diffusion layer.

Example 2

A gas diffusion layer was obtained in the same manner as in example 1, except that two unit carbon substrates manufactured according to preparation example 1 were stacked on each other so that second surfaces of first and second unit carbon substrates contacted each other.

Example 3

Two unit carbon substrates manufactured according to preparation example 1 were stacked on each other so that a second surface of a first unit carbon substrate and a first surface of a second unit carbon substrate contacted each other.

Each of the unit carbon substrates was formed, and then, cut to a certain length. Then, the unit carbon substrates were stacked on each other so that orientations of the carbon substrates were perpendicular to each other, and an aqueous polymer was coated on the stacked unit carbon substrates and the stacked unit carbon substrates were laminated. After that, the gas diffusion layer was obtained in the same manner as in example 1.

Example 4

A gas diffusion layer was obtained in the same manner as in example 3, except that two unit carbon substrates manufactured according to preparation example 1 were stacked on each other so that second surfaces of the two unit carbon substrates contacted each other.

Example 5

A stacked carbon substrate was manufactured by stacking, compressing, and drying two unit carbon substrates manufactured according to preparation example 2. The two unit carbon substrates were stacked on each other so that MD orientations of an upper unit carbon substrate and a lower unit carbon substrate were perpendicular to each other.

Each of the unit carbon substrates was formed and cut to a certain length, and the unit carbon substrates were stacked on each other so that orientations of the unit carbon substrates were perpendicular to each other. In addition, an aqueous polymer was coated on the stacked carbon substrates and the stacked carbon substrates were laminated. After that, a gas diffusion layer was obtained in the same manner as in example 1.

Comparative Example

Supplying of the dispersion liquid of carbon fibers into a supply unit of a head box via a pump was the same as in examples, but there was no slit structure between a wire and the supply unit, and thus, the carbon fibers were randomly arranged. The carbon fibers floated on a dispersion medium and were stacked on the wire in time, and after that, a drying process was performed. Processes after the drying process were of the same as in examples. A carbon substrate JNT30 (JNTC Co., Ltd.) manufactured by processes according to the prior art to have a thickness of about 270 μm was immersed into a 5 wt % PTFE solution (Du Pont) so that a content amount of the PTFE was about 10 wt % of the carbon substrate. Then, the carbon substrate was dried and thermally processed in air at a temperature of about 350° C. for 30 minutes to obtain a water-repellant carbon substrate.

A composition for a first microporous layer was coated on and impregnated into the water-repellant carbon substrate at about 50% of the composition into the water-repellant carbon substrate, followed by drying at about 120° C. to form a microporous layer. In addition, the water-repellant carbon substrate was thermally treated in air at a temperature of about 350° C. for about 30 minutes to obtain a gas diffusion layer.

The physical properties of the gas diffusion layers obtained in examples and the comparative example are shown in Table 1 below. An orientation of the fibers was measured by using a fiber orientation measurer manufactured by Nomura Shoji, Co., Ltd., and a ratio of the orientation in the machine direction was calculated with respect to the orientation in the transverse direction when the orientation in the transverse direction was set to be 1. A thickness of the carbon substrate was measured at a pressure of 2 N/cm$^2$ by using a thickness measurer, and a weight of the carbon substrate was measured by using a scale after cutting the carbon substrate to a predetermined equal size.

Measurement of Physical Properties

The physical properties of the gas diffusion layers obtained in examples and the comparative example were measured as follows. An orientation of the fibers was measured by using a fiber orientation measurer of Nomura Shoji, Co., Ltd., and a ratio of the orientation in the machine direction was calculated with respect to the orientation in the transverse direction when the orientation in the transverse direction was set to be 1. A thickness of the carbon substrate was measured at a pressure of 2 N/cm$^2$ by using a thickness measurer, and a weight of the carbon substrate was measured by using a scale after cutting the carbon substrate to a predetermined equal size.

A spring characteristic was measured by putting a gas diffusion layer in a sample holder of a universal tester, and then, by increasing a pressure gradually up to 200 N/cm$^2$ and decreasing and recovering the pressure, and performing a second cycle in the same manner. After that, in a third cycle, the pressure was increased up to 170 N/cm$^2$, and in a fourth cycle, the pressure was increased up to 60 N/cm$^2$ in order to measure a thickness. Then, a thickness variation in the third cycle, that is, at the pressure 170 N/cm$^2$, and in the fourth cycle, that is, at the pressure 60 N/cm$^2$, was measured. As the thickness variation was greater, it is understood that the sample has the stronger spring characteristic.

Intrusion was tested by placing two gas diffusion layers into the sample holder so that microporous layers of the two gas diffusion layers faced each other, and then pushing the gas diffusion layers with the holder having a channel-rib shape from opposite sides of the gas diffusion layers. By using the universal tester, intrusion values of the gas diffusion layer into the channel at the pressure levels of 0.75 MPa, 1 MPa, and 1.7 MPa were photographed by a microscope and measured.

Evaluation Example 1: Spring Characteristics

Figure 6:
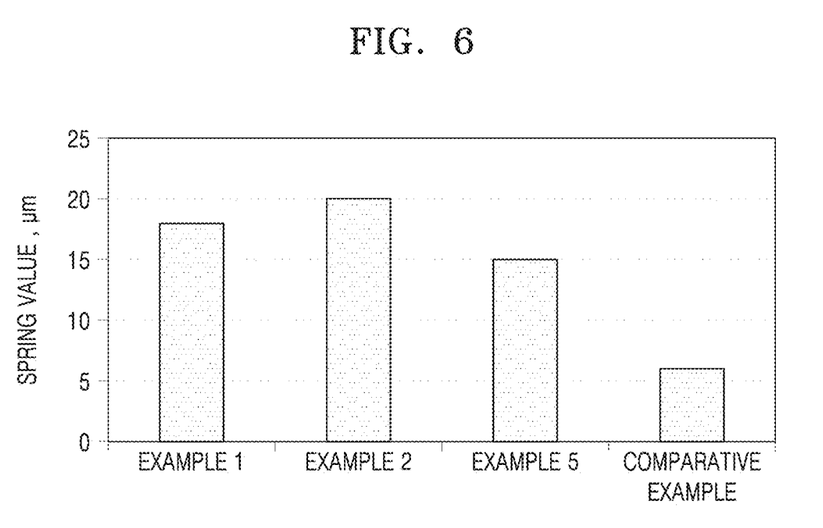
FIG. 6 is a graph showing spring characteristics according to an embodiment and the prior art.

The spring characteristics of the carbon substrates manufactured according to examples 1, 2, and 5 and the comparative example were measured and the results are shown in FIG. 6.

As shown in FIG. 6, according to the comparative example, when a pressure of 200 N/cm$^2$ was applied to the carbon substrate, a structure of the gas diffusion layer collapsed and a degree of recovering of the structure was low. Thus, the spring value was very low, that is, 6 μm. However, according to examples 1 and 2, the carbon substrates had different orientations of the carbon fibers stacked therein, and accordingly, the spring values of the carbon substrates of these examples were respectively 18 μm and 20 μm. According to example 5, the carbon substrate precursors having the second surfaces were stacked at an angle 90° with respect to each other, and thus, the spring value was slightly smaller than those in examples 1 and 2, but was greater than that in the comparative example.

In addition, with respect to examples 3 and 4, the unit carbon substrates were stacked so that the orientations of an n-th layer and an n−1st layer were perpendicular to each other, and the spring characteristics were 12 and 13, respectively. That is, the spring characteristics of examples 3 and 4 were greater than that of the comparative example, but less than those of examples 1 and 2. This can be because, when the carbon fibers oriented in the machine direction were perpendicular to each other, the strength becomes too strong and accordingly the elastic property is degraded.

Figure 7:
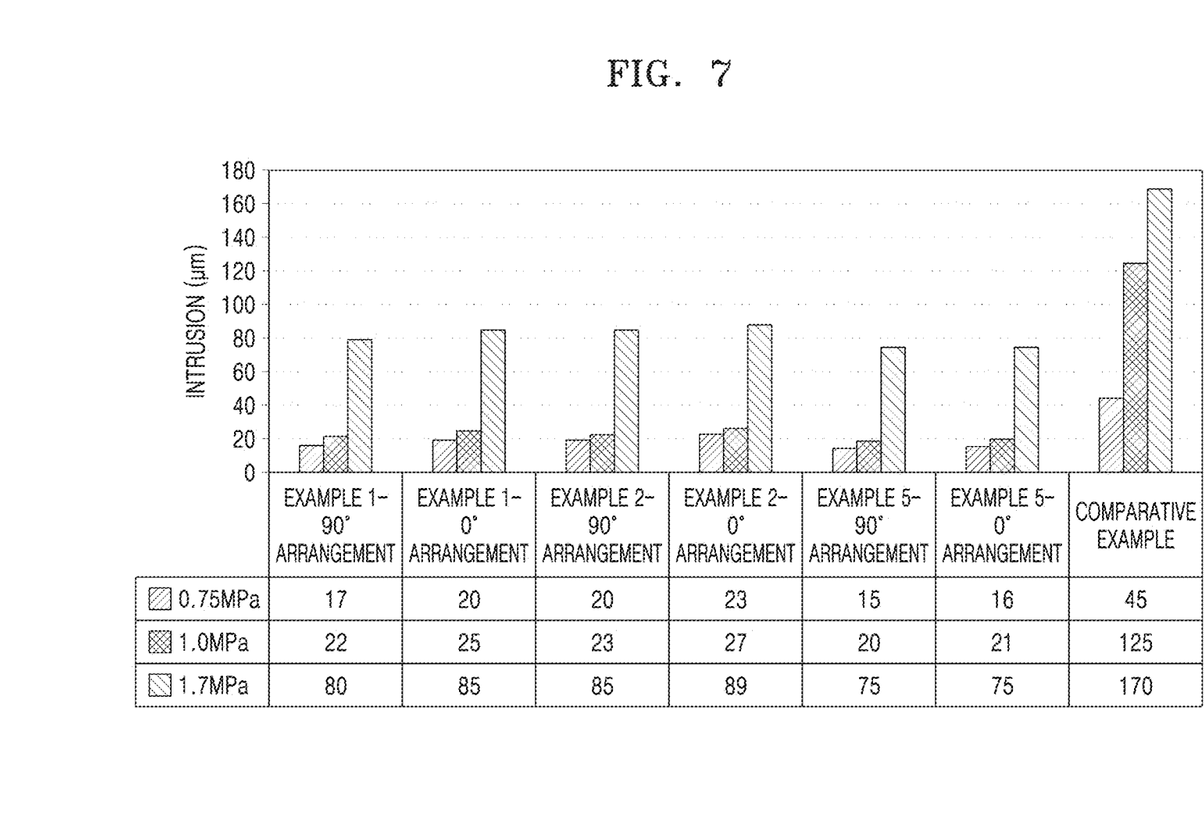
FIG. 7 is a graph showing intrusion characteristics according to an embodiment and the prior art on a metal bipolar plate.
Figure 8:
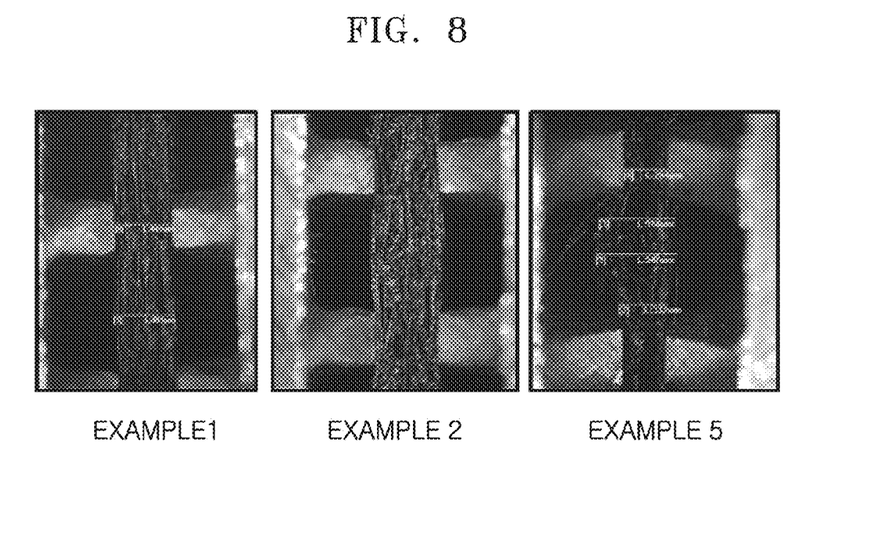
FIG. 8 shows examples of gas diffusion layers according to an embodiment and the prior art after being compressed by a pressure of 1 MPa.

Evaluation Example 2: Intrusion Amount of Carbon Substrates According to Compressive Pressure When two gas diffusion layers were put between two channels and pushed against each other while increasing the pressure, an intrusion amount of the surfaces of the gas diffusion layers into the channels was photographed via an endoscopy camera from the side of the gas diffusion layer. The result is shown in FIG. 7. Also, a variation in the structure of the gas diffusion layer was photographed and the result is shown in FIG. 8.

Referring to FIG. 7, an intrusion amount of the gas diffusion layer according to the comparative example was small at a pressure 0.75 MPa, but when the pressure increased, the gas diffusion layer rapidly broke and the intrusion amount of the gas diffusion layer into the channels increased. When the pressure applied slowly increased to the carbon fibers, which were randomly arranged, the carbon fibers contacting the ribs were crashed and intruded into the channels. The intrusion amounts of the gas diffusion layers in examples 1, 2, and 5 were about 17% to 22% of the comparative example at the pressure of 1 MPa, that is, the strength of the gas diffusion layers can be maintained stably irrespective of an the arrangement of the metal bipolar plate and the gas diffusion layer.

In examples 1 and 2, when the machine direction MD of the gas diffusion layer and the flow path direction of the metal bipolar plate were perpendicular to each other (90°) and the gas diffusion layers were compressed, intrusion of the gas diffusion layer was very low even at high pressure. In addition, when the gas diffusion layers were compressed in a state where the machine direction MD of the gas diffusion layers and the flow path direction were parallel to each other (0°), the intrusion amount was slightly greater than that in the case of the perpendicular arrangement (90°).

According to example 5, the gas diffusion layer formed by stacking the carbon substrate prewebs having the MD orientation at an angle of 90° had the lowest intrusion amount without regard to the arrangement of the flow fields in the metal bipolar plate. That is, the gas diffusion layer can have a very strong structure when the carbon fibers are arranged at an angle of 90°.

With respect to examples 3 and 4, in which the unit carbon substrates were stacked on one another so that the orientations at the n-th layer and the n−1st layer were perpendicular to each other, the intrusion characteristics were checked in the same manner as in examples 1 and 2. In examples 3 and 4, the strengths increased more than in examples 1 and 2, and the intrusion values were smaller than those in examples 1 and 2. That is, the intrusion values were 15 to 18 μm respectively in examples 3 and 4. That is, a pressure resistance increased since the carbon fibers oriented in the machine direction were perpendicular to each other, and accordingly, crash of the carbon fibers was greatly reduced.

FIG. 8 shows images of the gas diffusion layer that is partially broken and entered the channels. The images were taken by an optical microscope when the intrusion degree was measured at a pressure of 1 MPa.

According to the comparative example, since the two gas diffusion layers were pushed between the ribs, the structure of the carbon substrates collapsed, and then, many carbon fibers were disconnected and intruded into the channels. On the contrary, according to examples 1 and 5, since the gas diffusion layer and the channels were arranged at 90° with respect to each other, a very stable structure was obtained, and accordingly, the resistance against the compressing pressure was sufficient and the intrusion degree was very small.

Evaluation Example 3: Gas Permeability of Carbon Substrate

In the bipolar plate of a flow field structure according to the prior art, even in-plane diffusion of oxygen introduced in the flow fields when the oxygen is moved to a catalyst layer through the gas diffusion layer is an important factor. However, in the porous bipolar plate, supply of oxygen is not concentrated in a certain passage such as the flow field, but is evenly distributed throughout the entire bipolar plate. Therefore, with respect to gas diffusion, an environment in which the gas supplied to the bipolar plate can be directly moved to the catalyst layer has to be considered, rather than even in-plane distribution, and then, thru-plane gas diffusion becomes an important variable.

A thru-plane gas permeability in example 1 increased more than 6 times compared with the comparative example. Additionally, the orientation in the machine direction MD increased and the carbon fibers were oriented in the machine direction both on the first and second surfaces in example 1. Also, an in-plane gas permeability in example 1 was 1.4 times greater than that of the comparative example. That is, when the porous bipolar plate is applied to a unit cell, the thru-plane gas permeability improves in the gas diffusion layer in a fully isotropic carbon substrate in which the carbon fibers are oriented in the machine direction both on the first and second surfaces.

Also, a unit cell performance test was performed in a state where the gas diffusion layer manufactured according to example 1 was arranged in a direction perpendicular to the machine direction MD of the carbon substrate and the flow field direction of the metal bipolar plate. As a result, the performance in example 1, in which the in-plane gas permeability and the thru-plane gas permeability were improved, was improved because the carbon substrate was less intruded and the gas diffusion resistance was reduced. Thus, the reaction gas can be evenly diffused in-plane and thru-plane, and availability of the catalyst increases and performance of the membrane electrode assembly (MEA) is improved.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details can be made therein without departing from the spirit and scope of the inventive concept as defined by the following claims.

EXPLANATIONS FOR MAJOR REFERENCE NUMERALS

A: Unit carbon substrate according to an embodiment
A': Unit carbon substrate A rotated at an angle of 90° in a clockwise direction
B: Unit carbon substrate according to another embodiment
B': Unit carbon substrate B rotated at an angle of 90° in a clockwise direction
a: first surface of a substrate
b: second surface of a substrate

What is claimed is:

1. A carbon substrate for a gas diffusion layer of a fuel cell, the carbon substrate comprising a structure in which two to eight unit carbon substrates are stacked,
wherein each of the unit carbon substrates is a plate type substrate having a first surface and a second surface opposite the first surface,
each of the unit carbon substrates comprises carbon fibers forming a non-woven carbon backing layer and a carbonized organic polymer arranged between the carbon fibers and bonding the carbon fibers,
wherein a) the number of the carbon fibers arranged in a machine direction (MD) in each of the unit carbon substrates is greater than the number of carbon fibers arranged in a transverse direction (TD) in each of the unit carbon substrates,
the carbon fibers are randomly arranged on the first surface of the each of the unit carbon substrates and, from the first surface to the second surface in a thickness direction of each of the unit carbon substrates, the number of the carbon fibers arranged in the machine direction of each of the unit carbon substrates becomes greater than the number of carbon fibers arranged in the transverse direction of each of the unit carbon substrates, and accordingly, an orientation gradient is formed so that an orientation in the machine direction increases from the first surface to the second surface, or
b) the number of carbon fibers arranged in the machine direction of each of the unit carbon substrates is greater than the number of carbon fibers arranged in the transverse direction of each of the unit carbon substrates so that each of the unit carbon substrates has an orientation in the machine direction,
the orientation in the machine direction of each of the unit carbon substrates is constant from the first surface to the second surface along the thickness direction of each of the unit carbon substrates, and
the unit carbon substrates are stacked on one another so that the machine directions of two adjacent unit carbon substrates are perpendicular to each other.

2. The carbon substrate of claim 1, wherein in a), a ratio of the number of carbon fibers arranged in the machine direction to the number of carbon fibers arranged in the transverse direction (MD/TD) on the second surface is 1.5 to 4.0.

3. The carbon substrate of claim 1, wherein in a), the unit carbon substrates are stacked on one another so that the first surface of one of two adjacent unit carbon substrates contacts the second surface of the other of the two adjacent unit carbon substrates.

4. The carbon substrate of claim 3, wherein the unit carbon substrates are stacked on one another so that the machine directions of the unit carbon substrates are parallel to each other.

5. The carbon substrate of claim 3, wherein the unit carbon substrates are stacked on one another so that the machine directions of two adjacent unit carbon substrates are perpendicular to each other.

6. The carbon substrate of claim 1, wherein in a), the unit carbon substrates are stacked on one another so that the first surfaces or second surfaces of two adjacent unit carbon substrates contact each other.

7. The carbon substrate of claim 6, wherein the unit carbon substrates are stacked on one another so that the machine directions of the unit carbon substrates are parallel to each other.

8. The carbon substrate of claim 6, wherein the unit carbon substrates are stacked on one another so that the machine directions of two adjacent unit carbon substrates are perpendicular to each other.

9. The carbon substrate of claim 1, wherein in b), a ratio of the number of carbon fibers arranged in the machine direction to the number of carbon fibers arranged in the transverse direction (MD/TD) is 1.5 to 4.0.

10. The carbon substrate of claim 1, wherein in b), the carbon fibers comprise two or more types of carbon fibers having different lengths, the two or more types of carbon fibers comprise first carbon fibers and second carbon fibers, lengths of the second carbon fibers are longer than lengths of the first carbon fibers, the first carbon fibers are arranged more than the second carbon fibers toward the first surface in the thickness direction of the unit carbon substrate, whereas the second carbon fibers are arranged more than the first carbon fibers toward the second surface, and a pore size gradient is shown so that sizes of pores increase gradually from the first surface to the second surface in the thickness of each of the unit carbon substrates.

* * * * *